United States Patent
Khorram

(10) Patent No.: US 6,175,425 B1
(45) Date of Patent: Jan. 16, 2001

(54) DOCUMENT IMAGING SYSTEM FOR AUTODISCRIMINATION OF TEXT AND IMAGES

(75) Inventor: Ramin Khorram, Derry, NH (US)

(73) Assignee: Oak Technology, Inc., Sunnyvale, CA (US)

( * ) Notice: Under 35 U.S.C. 154(b), the term of this patent shall be extended for 0 days.

(21) Appl. No.: 09/007,690

(22) Filed: Jan. 15, 1998

(51) Int. Cl.[7] ................................................. H04N 1/387
(52) U.S. Cl. ........................ 358/1.9; 382/173; 382/176
(58) Field of Search ............................ 358/1.9; 382/173, 382/176, 237, 239, 251

(56) References Cited

U.S. PATENT DOCUMENTS

| | | | |
|---|---|---|---|
| 4,856,075 | 8/1989 | Smith | 382/50 |
| 4,862,283 | 8/1989 | Smith | 358/443 |
| 4,974,171 | * 11/1990 | Yeh et al. | 364/519 |
| 4,996,603 | 2/1991 | Kanemitsu et al. | 358/462 |
| 5,239,390 | * 8/1993 | Tai | 358/458 |

* cited by examiner

Primary Examiner—Thomas D. Lee
Assistant Examiner—Stephen Brinich
(74) Attorney, Agent, or Firm—Testa, Hurwitz & Thibeault, LLP

(57) ABSTRACT

An apparatus for autodiscrimination of multi-level signal representative of a document having text and image content is described. A content module processes the multi-level signal serially. Portions of the signal corresponding to text and fine line features are processed to enhance contrast. Portions of the signal corresponding to images are processed to enhance image quality. In one embodiment, the content processor includes a digital signal processor and random access memory. The digital signal processor can be programmable, allowing the methods used to process the document data to be adapted to different types of documents. Text orientation in the document is not critical due to the random accessibility of the memory. The invention also relates to a method of processing a document image.

4 Claims, 6 Drawing Sheets

DOCUMENT IMAGING SYSTEM FOR AUTODISCRIMINATION OF TEXT AND IMAGES

FIELD OF THE INVENTION

The invention relates generally to an apparatus and method for obtaining a binary representation of a document containing text and images. In particular, the invention relates to an apparatus for autodiscrimination between document areas containing text or line art and areas containing continuous-tone images.

BACKGROUND OF THE INVENTION

Document imaging systems (e.g., copiers and facsimiles) often represent documents as digital data which is used for reproduction or transmission of an original document. Comparing the intensity level of an element of the image (e.g., a pixel) to a threshold level yields binary data. If the intensity level exceeds the threshold, the element is represented by a binary value indicating white. If the intensity level does not exceed the threshold, the element is represented by a binary value indicating black. Problems occur when the document contains both text and images (e.g., photographs). Images typically contain a range of intensity values (i.e., gray scale) which cannot be preserved by the threshold process. Lines and line art can also present a problem for the threshold process. Lines can yield intensity levels which exceed the threshold in some image locations and do not exceed the threshold in other locations, depending on the width and orientation of the lines with respect to image elements. As a result, portions of the line in the processed image can be lost.

FIG. 1 illustrates the use of a conventional image processor for reproduction of documents. An original document 10 containing areas of text (i.e., characters) 12, images 14 and line features 16 is scanned by a document scanner 18. The scanner 18 generates a multi-level signal which is processed by an image processor 20. The image processor 20 processes the multi-level signal and provides a processed multi-level signal to a laser printer 22 or other output device which generates a reproduction 24 of the original document 10.

It is advantageous to process document areas containing characters and lines differently from document areas with embedded images. For example, character and line areas can be processed to enhance contrast and image areas can be processed to enhance image quality. FIG. 2 illustrates a document imaging system 30 described in Japanese Patent Publication No. 58-3374 utilizing two distinct image processing means. A multi-level signal representative of the document is received by a multi-level signal processing means 32 and a dither processing means 34. The output of the multi-level signal processing means 32 is provided to a separation means 36 and a selection means 38. The output of the dither processing means 34 is provided to the selection means 38. The separation means 36 autodiscriminates between portions of the multi-level signal corresponding to text and portions corresponding to image information based on characteristics of the output of the multi-level processing means 32. The separation means 36 generates a selection signal based on the autodiscrimination and provides it to the selection means 38. The selection means 38 generates an output signal by combining portions of the outputs from the processing means 32 and 34 according to the selection signal.

FIG. 3 shows another document imaging system 40 described in U.S. Pat. No. 4,996,603. A multi-level signal representative of the document is received by a character/photo separation circuit 42, a fixed slice processing circuit 44 and a halftone processing circuit 46. The outputs of the fixed slice processing circuit 44 and halftone processing circuit 46 are received by a selection circuit 48. The character/photo separation (autodiscrimination) circuit 42 generates a selection signal based on characteristics of the unprocessed multi-level signal. The selection circuit 48 generates an output signal by combining portions of the outputs from the fixed slice processing circuit 44 or the halftone processing circuit 46.

The prior art document imaging systems illustrated in FIGS. 2 and 3 have several disadvantages. The systems require circuitry to implement the separation and selection processes. The output signals from the processing means 32 and 34 or processing circuits 44 and 46 must be synchronized. Therefore, the memory used in the processing means 32 and 34 or processing circuits 44 and 46 must be matched to insure equal delay. Also, prior art document imaging systems are typically optimized for a particular orientation. As a result, text printed on a page in a vertical orientation might not be recognized as text and, therefore, the text might be processed as an image. The processed document would then contain inferior quality vertically oriented text. A preferred text orientation can also create other difficulties. For example, it can be more efficient (i.e., higher document throughput) to scan a standard document so that the scan line (e.g., CCD linear array line) is parallel to the longer document dimension, especially where the document processing rate is limited by the paper translation rate or scanner translation rate. The horizontal document text then appears vertically oriented to the scanner and results in inferior quality text.

SUMMARY OF THE INVENTION

The present invention relates to a document image processing apparatus and method that separate character and image data. The apparatus and method are applied to a multi-level signal containing character and image data in the document and can also contain color data.

The apparatus includes an input module for receiving the multi-level signal. In one embodiment, an optical scanner generates the multi-level signal. A content module is coupled to the input module to process the multi-level signal. Portions of the multi-level signal containing text or lines are processed to enhance contrast. Portions of the multi-level signal containing image data are processed to enhance image quality. The content module can include a digital signal processor (DSP) which can be programmable. In one embodiment, the content processor also includes a random access memory (RAM) in communication with the DSP. A halftone processor receives the content-processed multi-level signal from the content module and processes the signal according to a halftone processing technique. The halftone processor module can include a DSP. In one embodiment, the halftone processor module implements a dither processing technique. In another embodiment, the halftone processor module implements a diffusion dither technique. The apparatus also includes an output module coupled to the halftone processor module. The output module provides the output signal from the halftone processor to an output port.

The programmability of the DSP allows the methods used to process the document data to adapt to different types of documents. One program can potentially accommodate all likely document formats. The prior art document imaging systems employ separation and selection modules which can only be optimized for a particular type of document. In addition, the programmability of the DSP permits a wide range of processing sophistication which extends beyond a level reasonably implemented in fixed (i.e., hardwired) circuitry. Furthermore, orientation of the image is not critical to processing in the present invention since the memory is randomly accessible. This allows the DSP algorithms to access any part of the stored image in any order.

The invention also features a method for processing a document image. The method includes receiving a multi-level signal representative of a document. At least one filter is applied to the multi-level signal to generate templates identifying high contrast document areas (i.e., areas having text or line features). The one or more filters can be two-dimensional high pass image filters. Portions of the multi-level signal corresponding to the high contrast areas are processed to enhance the edges and text features. In one embodiment, processing includes setting the high contrast data in the multi-level signal at the highest or lowest value for the corresponding document area to preserve the bi-tonal nature of text and lines. In another embodiment, processing includes application of at least one two-dimensional high pass image filter. The low contrast areas (i.e., areas not identified by the templates) typically correspond to background areas or images embedded in the document. Portions of the multi-level signal corresponding to low contrast areas are processed to enhance image quality. In one embodiment, the processing of the low contrast areas includes application of at least one two-dimensional low pass image filter. An output signal is generated from the processed high contrast and low contrast portions of the multi-level signal. The output signal can be halftone processed. In one embodiment, the halftone processing includes using a dither technique. In another embodiment, the halftone processing includes using a diffusion dither technique.

DETAILED DESCRIPTION OF THE INVENTION

Figure 1:
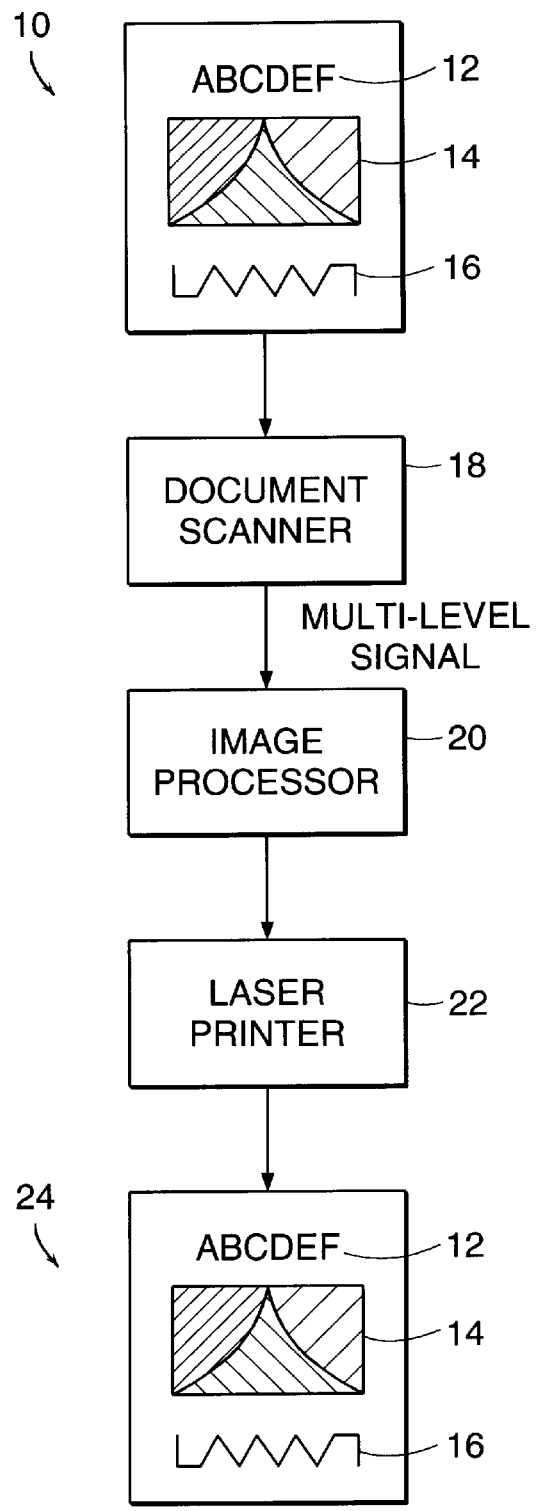
FIG. 1 is a functional block diagram illustrating the use of a known document image processing system.
Figure 2:
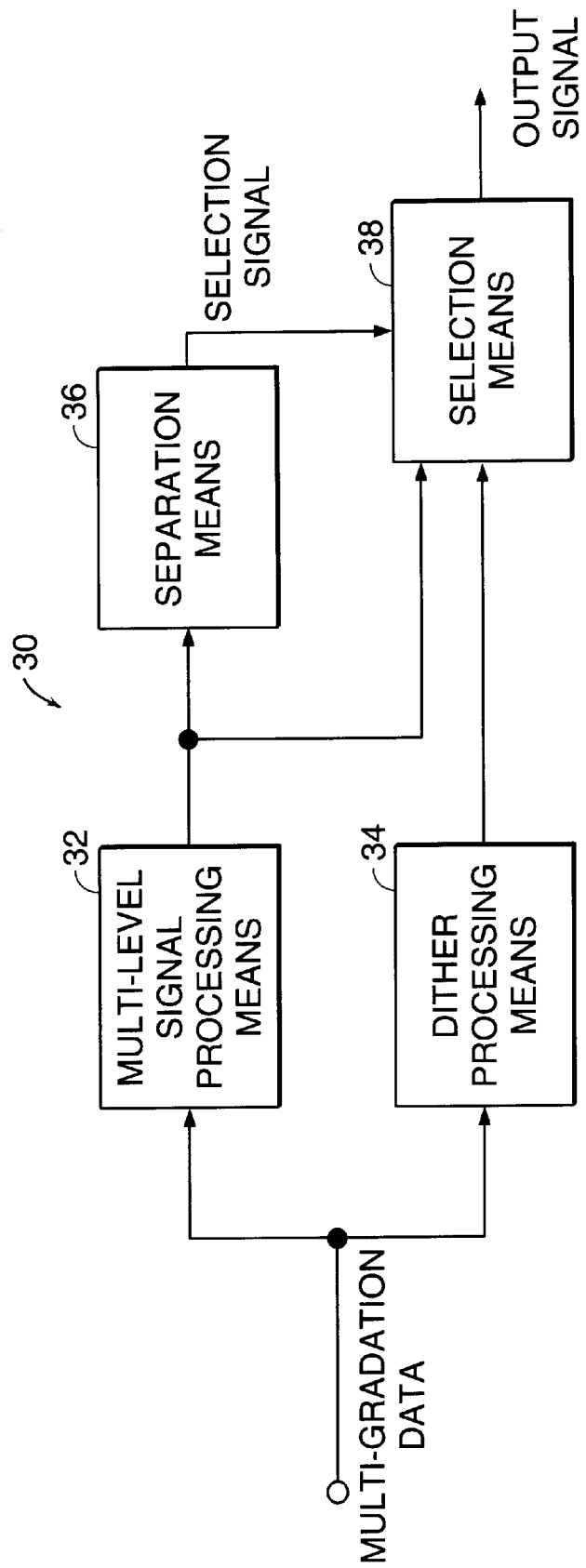
FIG. 2 is a functional block diagram of another known document image processing system.
Figure 3:
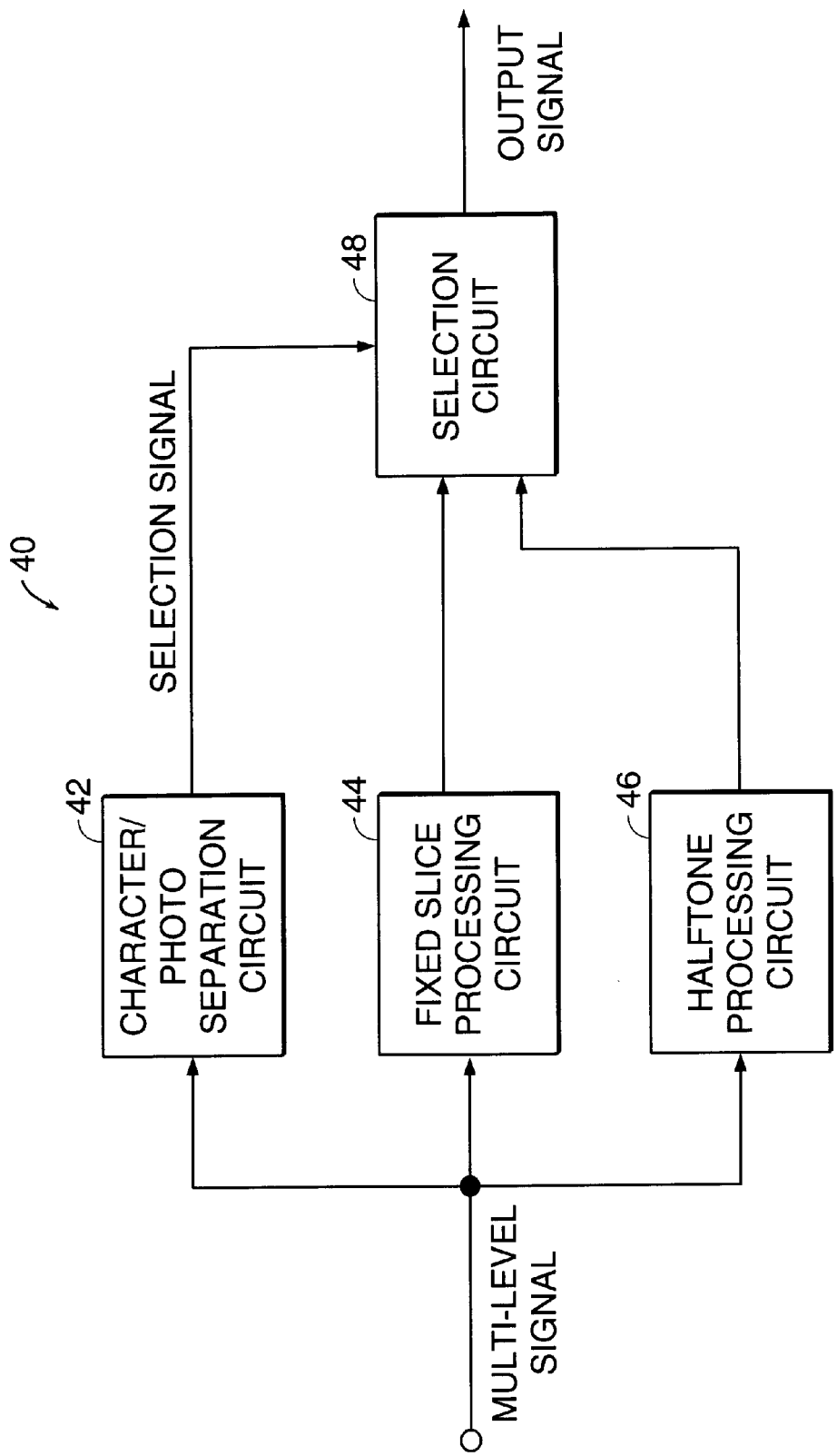
FIG. 3 is a functional block diagram of yet another known document image processing system.
Figure 4:
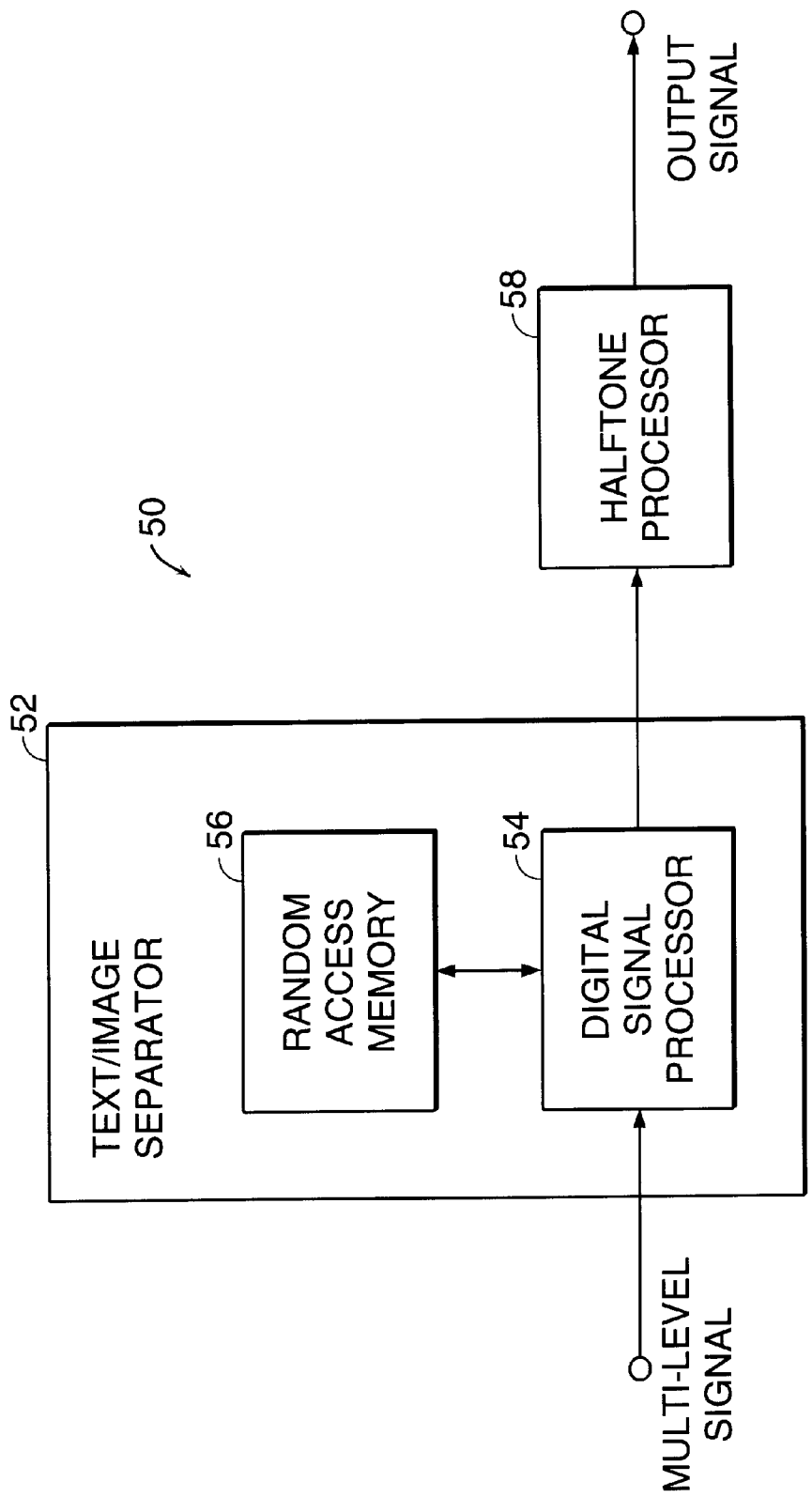
FIG. 4 is a functional block diagram of a document image processing system utilizing an autodiscrimination technique in accordance with the present invention.

Referring to FIG. 4, a block diagram of the document image processor 50 of the present invention is shown. A multi-level signal is provided a text/image separator 52 which includes a DSP 54 coupled to a RAM 56. The RAM 56 provides multi-line memory for the image data received by the DSP 54. During processing, the DSP 54 can randomly access data in the RAM 56 thus providing the flexibility to adapt to different document orientations. The programmability of the DSP 54 allows the algorithms used to process the multi-level signal data to be adapted to different types of documents. The modified multi-level signal generated by the DSP 54 is provided to a conventional halftone processor 58 which generates an output compatible with an output device (not shown).

Figure 5:
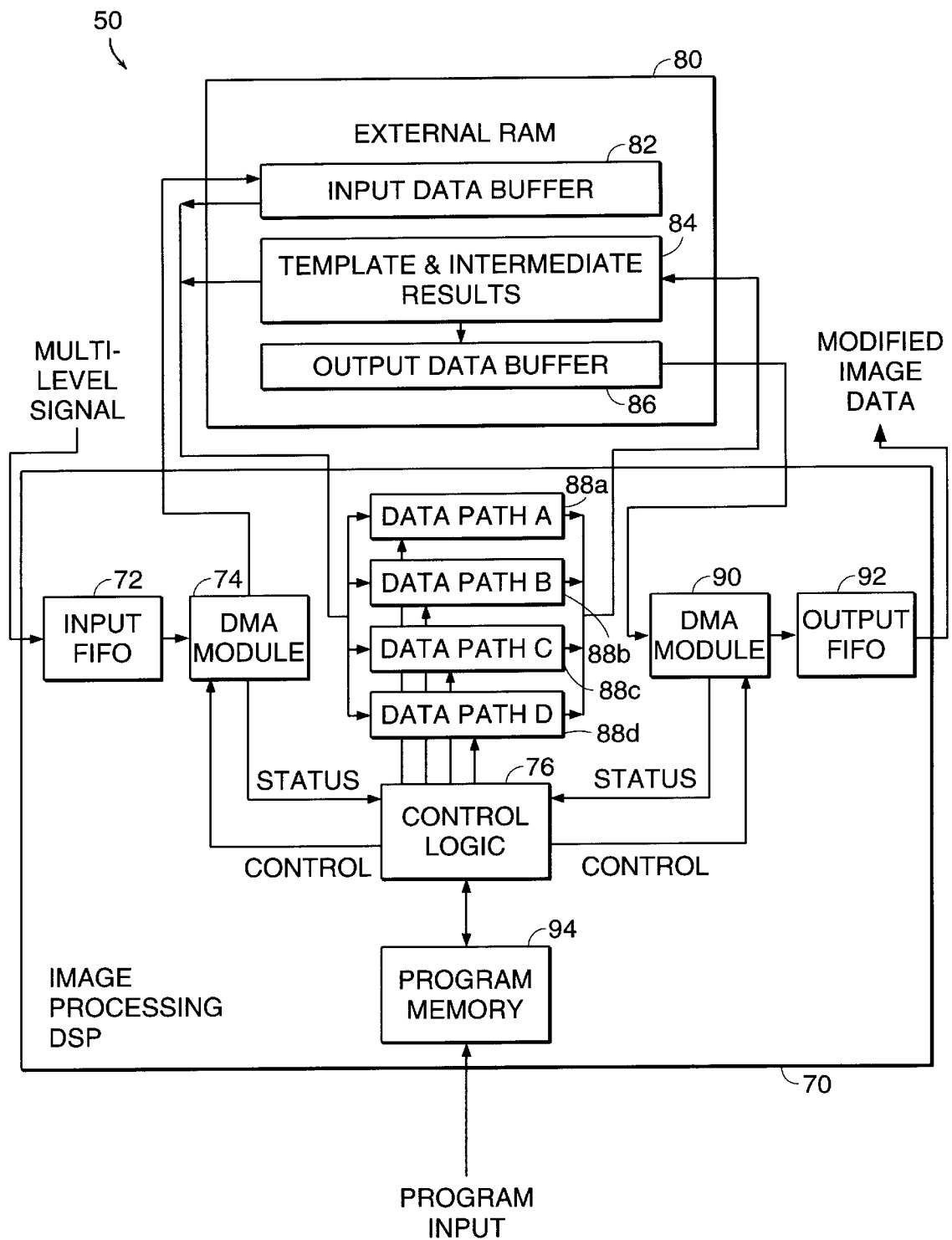
FIG. 5 is a detailed block diagram of a document image processing utilizing an autodiscrimination technique in accordance with the present invention.

FIG. 5 illustrates the data flow for one implementation of the document image processor 50. An image processing DSP 70 receives a multi-level signal from an optical scanner (e.g., a linear CCD array) or other input device. The multi-level signal data is temporarily stored in an input first-in-first-out (FIFO) memory 72 where it is then accessed by a direct memory access (DMA) module 74. A control logic module 76 controls the DMA module 74 and monitors status. The control logic module 76 receives its instructions from a program memory 94. Different programs can be written to program memory 94 to accommodate the processing of various types of documents. The DMA module 74 provides data to the input data buffer section 82 of an external RAM 80. The input data buffer section 82 provides the data to data paths 88 for parallel processing of different data segments under the control of the control logic module 76. This parallel processing architecture increases the overall processing speed of the image processing DSP 70. Data resulting from data path processing is returned to the template and intermediate results memory section 84 where the results can again be provided to the data paths 88 or passed to the output data buffer section 86. Data in the output data buffer section 86 is passed to a second DMA module 90 according to a control signal from the control logic module 76. The second DMA module 90 outputs the data to an output FIFO 92 which can provide the modified image data to other modules or devices.

Figure 6:
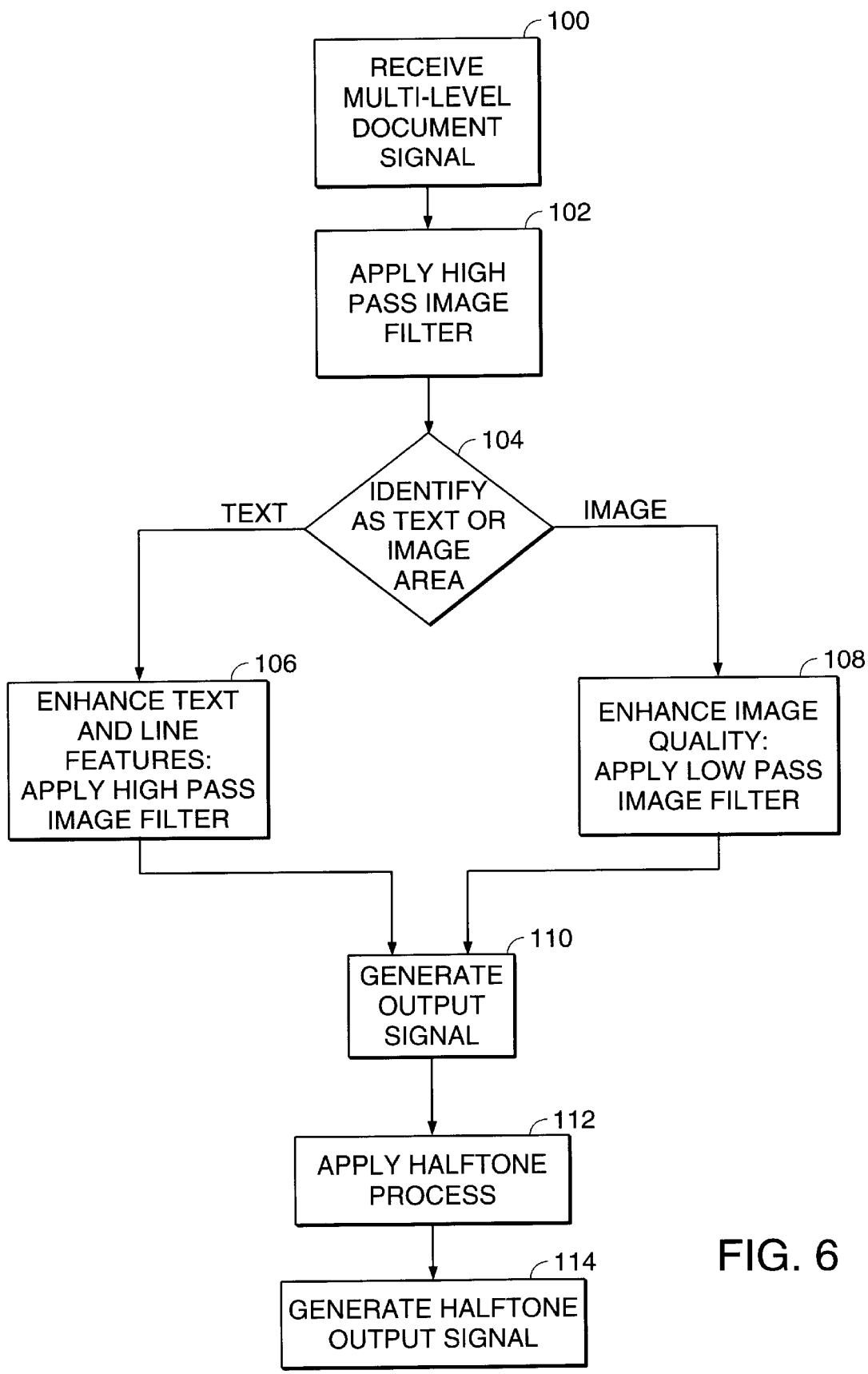
FIG. 6 is a flowchart of a method for processing a document image using an autodiscrimination technique.

Referring to flowchart in FIG. 6, one implementation of the method of the invention is described as a series of steps. At step 100, a multi-level signal representative of a document is received. At step 102, a high pass two-dimensional image filter is applies to the signal to generate templates defining high contrast areas in the document. The text and image areas are then identified (i.e., discriminated) in step 104 so that portions of the multi-level signal are processed accordingly. In step 106, a high pass image filter is applied to each portion of the multi-level signal having text or line data. Alternatively, in step 108, a low pass filter is applied to each portion of the multi-level signal having image data. Portions of the multi-level signal are always processed serially. More specifically, any data in the multi-level signal identified to represent textual information is processed only according to step 106. Conversely, any data identified to represent image information is processed only according to step 108. This avoids the need to delay a processed signal to insure simultaneous arrival of data at an output generation module. At step 110, an output signal is generated by sequentially concatenating the processed text and image portions of the multi-level signal. At step 112, the output signal is halftone processed and, at step 114, a halftone output signal is generated.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for processing a document image comprising the steps of:

a) receiving a multi-level signal representative of a document;

b) applying at least one filter to the multi-level signal to generate templates defining high contrast areas in the document, each of the high contrast areas having a low value and a high value;

c) processing high contrast portions of the multi-level signal to generate a high contrast modified multi-level signal having enhanced edges and text features, the signal data in each high contrast portion being set to one of the low value and the high value of the respective contrast area;

d) processing low contrast portions of the multi-level signal not defined by the templates to generate a low contrast modified multi-level signal having enhanced image quality; and e) generating an output signal based on the processed signals.

2. A method for processing a document image comprising the steps of:

a) receiving a multi-level signal representative of a document;

b) applying at least one two-dimensional high pass image filter to the multi-level signal to generate templates defining high contrast areas in the document;

c) processing high contrast portions of the multi-level signal to generate a high contrast modified multi-level signal having enhanced edges and text features;

d) processing low contrast portions of the multi-level signal not defined by the templates to generate a low contrast modified multi-level signal having enhanced image quality; and e) generating an output signal based on the processed signals.

3. A method for processing a document image comprising the steps of:

a) receiving a multi-level signal representative of a document;

b) applying at least one filter to the multi-level signal to generate templates defining high contrast areas in the document;

c) processing high contrast portions of the multi-level signal using at least one two-dimensional high pass image filter to generate a high contrast modified multi-level signal having enhanced edges and text features;

d) processing low contrast portions of the multi-level signal not defined by the templates to generate a low contrast modified multi-level signal having enhanced image quality; and e) generating an output signal based on the processed signals.

4. A method for processing a document image comprising the steps of:

a) receiving a multi-level signal representative of a document;

b) applying at least one filter to the multi-level signal to generate templates defining high contrast areas in the document;

c) processing high contrast portions of the multi-level signal to generate a high contrast modified multi-level signal having enhanced edges and text features;

d) processing low contrast portions of the multi-level signal not defined by the templates using at least one two-dimensional low pass image filter to generate a low contrast modified multi-level signal having enhanced image quality; and e) generating an output signal based on the processed signals.

* * * * *